United States Patent [19]
Garrison

[11] Patent Number: 5,369,900
[45] Date of Patent: Dec. 6, 1994

[54] TAMPER-RESISTANT OWNER IDENTIFICATION BADGE FOR BICYCLES

[76] Inventor: Steve Garrison, 402 Oak Ct., Baltimore, Md. 21228

[21] Appl. No.: 66,717

[22] Filed: May 24, 1993

[51] Int. Cl.⁵ .............................................. G09F 3/02
[52] U.S. Cl. .................................. 40/299; 40/631; 40/590
[58] Field of Search ............... 40/299, 631, 590, 308, 40/316, 5, 607; 403/310, 312, 315, 319, 337; 280/288.4, 727

[56] References Cited

U.S. PATENT DOCUMENTS

| | | |
|---|---|---|
| 575,910 | 1/1897 | Sherman . |
| 583,863 | 6/1897 | Alley ............................ 40/299 X |
| 747,854 | 12/1903 | Clark ............................ 403/319 X |
| 1,312,990 | 8/1919 | Garbis ........................... 40/631 X |
| 1,851,046 | 3/1932 | Horni ............................ 40/607 |
| 1,930,783 | 10/1933 | Watson et al. .................. 40/631 |
| 2,193,680 | 3/1940 | Weissert ........................ 403/315 X |
| 2,582,679 | 1/1952 | Carroll .......................... 403/312 X |
| 4,068,858 | 1/1978 | Harrison et al. ................. 40/590 X |
| 4,327,512 | 5/1982 | Oliver . |
| 4,497,124 | 2/1985 | Olive ............................ 40/299 |
| 5,016,368 | 5/1991 | Cassata ......................... 40/299 |
| 5,123,770 | 6/1992 | Trenner ......................... 403/310 X |

FOREIGN PATENT DOCUMENTS

| | | | |
|---|---|---|---|
| 2051151 | 3/1992 | Canada .......................... | 40/308 |
| 38383 | 1/1936 | Netherlands . | |
| 115442 | 11/1945 | Sweden .......................... | 40/590 |
| 18958 | of 1906 | United Kingdom ................ | 40/590 |

Primary Examiner—Kenneth J. Dorner
Assistant Examiner—Joanne Silbermann

[57] ABSTRACT

A tamper-resistant owner identification badge for bicycles comprises a hardened steel badge debossed with a registration number, a reward offer, and a toll-free phone number. An aluminum sticker inscribed with the owner's personal information is attached to the badge. The badge, formed by two opposing casing members, is mounted around the seatstay tube of a bicycle. Two screws sunken into counterbores hold the casing members firmly together. Sealing discs tapped flush into the counterbores permanently deny access to the screws, so that removal of the badge is extremely difficult for even the most experienced thieves. The personal information on the badge provides anyone who sees the bicycle, but particularly law enforcement authorities, a means to compare the person possessing the bicycle with the characteristics of the rightful owner. Even if the sticker is removed, the reward offer and the toll-free number will help to induce any person who finds the bicycle to report the discovery.

14 Claims, 3 Drawing Sheets

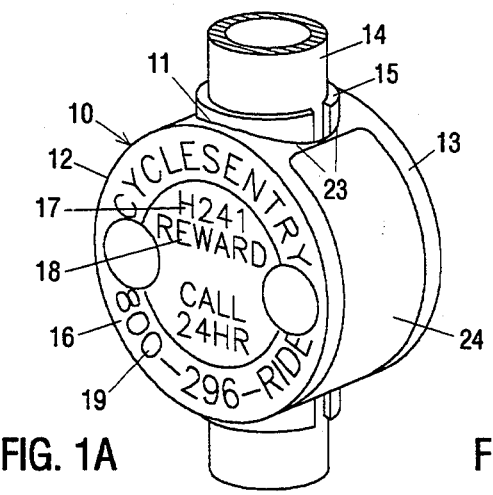
FIG. 1A
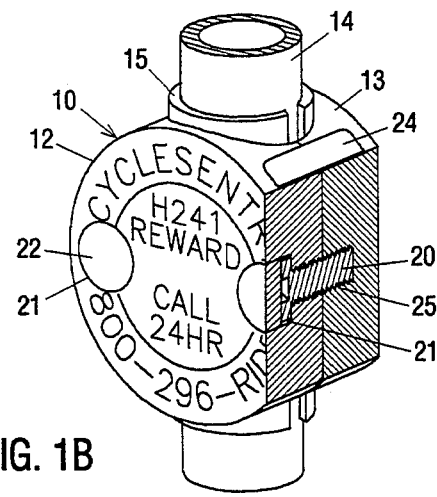
FIG. 1B
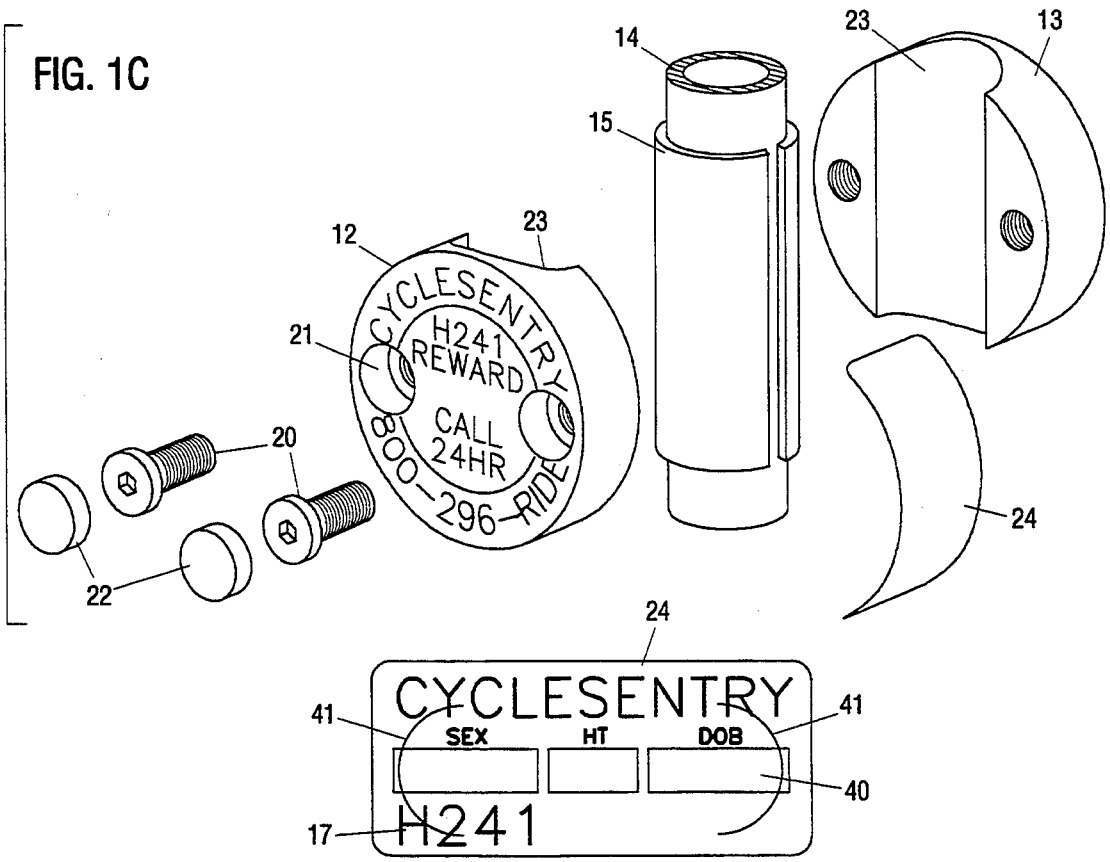
FIG. 1C
FIG. 1D

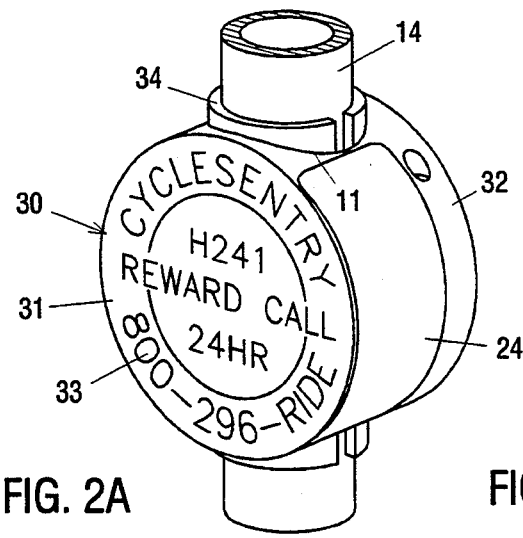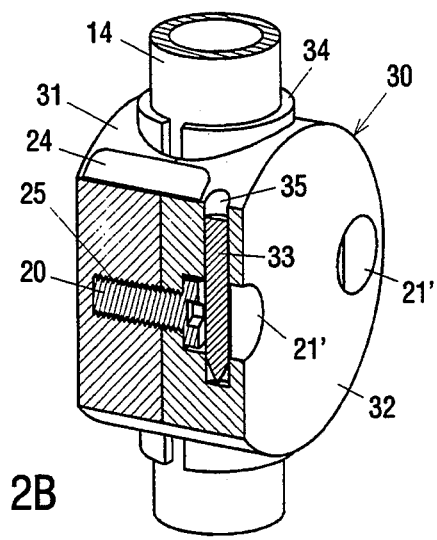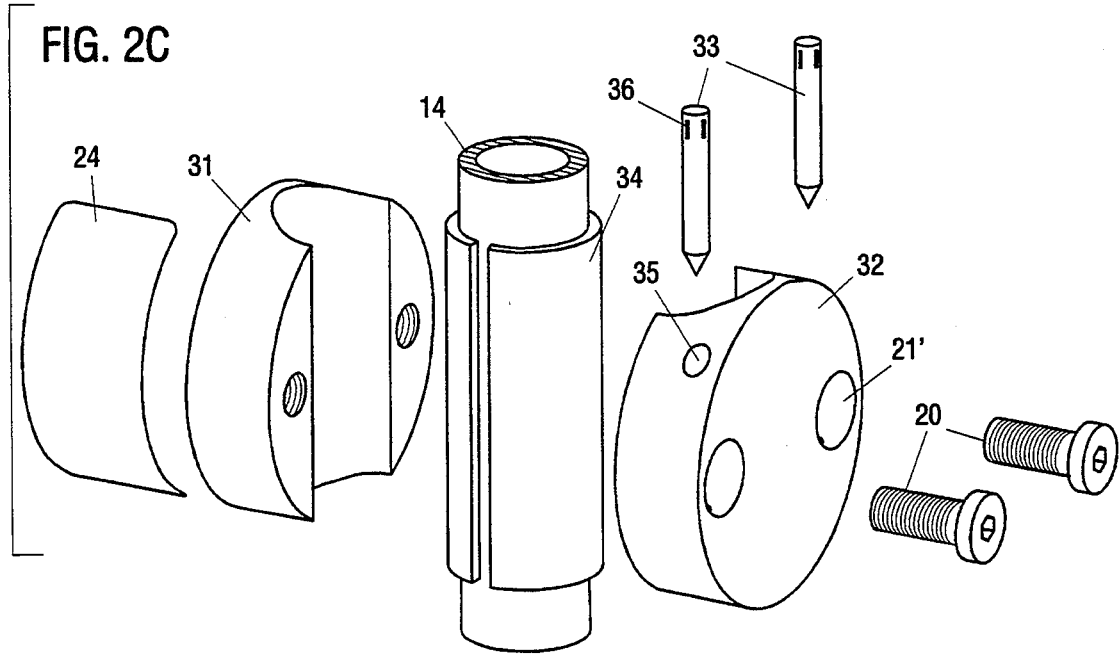

TAMPER-RESISTANT OWNER IDENTIFICATION BADGE FOR BICYCLES

FIELD OF THE INVENTION

This invention relates generally to identification devices, particularly to a tamper-resistant identification badge for mounting on bicycles.

BACKGROUND OF THE INVENTION

Bicycles are valuable assets that are often exposed to potential theft during their normal course of use. Their inherent portability allows them to be quickly stolen when left, even just temporarily, on the sidewalk or other public places. As a result, many bicycle owners attempt to counter this threat by locking their bicycles when they must be left unattended. However, the quality and effectiveness of locking devices vary greatly. Therefore many of the lesser locking devices can easily be defeated with simple tools such as lock picks, saws, and bolt cutters. Even when a strong locking device is used, a suitable object onto which the bicycle can be locked may not always be available.

A common method for protecting possessions which cannot be effectively immobilized is the use of identification markings. Steel stamps have been made for stamping identification marks, such as the owner's name, address, or a unique code, onto objects such as electronic equipment, tools, automobiles, etc. When these items are stolen and later found in the possession of unauthorized persons, the markings can help identify the persons as thieves or buyers of stolen property. More importantly, they can also help to return the items to their rightful owners. However, because these stamped markings are usually quite small, they often go unnoticed. As a result, many of the marked items escape from being detected as stolen. Furthermore, the small size of these stamped markings, which are usually made on sheet metal or plastic, allows the thieves to easily remove or otherwise destroy them by filing or grinding.

A far more effective method of marking an item is the use of permanent identification badges. Their relatively large size makes them much more visible, so that stolen items can be more readily recognized as stolen. U.S. Pat. No. 575,910 to Sherman (1897) shows a bicycle identification device comprising a cap for fitting over a slot cut into the frame of a bicycle. A spring secures the cap and holds an identification card within the frame. The main drawback is the need to cut a slot into the frame. Aside from being difficult to perform for the average bicycle owner, the slot weakens the structure of the bicycle. Netherlands patent 38,383 to Schot (1936) shows an identification badge affixed to a flap on the back of a clock, which in turn is mounted on the steering shaft of a bicycle with a short arm. However the flap, along with the badge, can be easily removed by force with common pliers. Sweden patent 115,442 to Jonsson (1945) shows an identification ring for mounting around the frame of a bicycle. The name and phone number of the owner are inscribed on the ring. Because it is made of relatively thin sheet metal, this device can also be easily removed. Although all of these badges provide a highly visible means for identifying the owner of a bicycle, none of them can ensure that they will remain on the bicycle to carry out their function.

SUMMARY OF THE INVENTION

Accordingly several objects and advantages of the invention are to provide a permanent owner identification badge for bicycles which is easily noticed, which positively identifies the owner of the bicycle, which quickly exposes any thief in possession of the bicycle, which is highly resistant against the destruction of the indicia on the badge, which is highly resistant against the forced removal of the badge, which can induce a person who finds a lost or stolen bicycle to report its discovery, which deters thieves from stealing the bicycle, which deters buyers from buying stolen bicycles, which can be mounted on bicycles of different sizes, and which is simple and economical to manufacture. Further objects and advantages will become apparent from a study of the following description and the accompanying drawings.

In a preferred embodiment of the invention, a tamper-resistant owner identification badge for bicycles comprises two halves of a case hardened, steel badge debossed with a toll-free phone number, a unique registration number, and a reward offer. An aluminum sticker inscribed with the owner's personal information is attached to the badge. The badge is mounted around the seatstay tube, or the chainstay tube, on the frame of a bicycle. Two sunken screws, which are treated with a permanent thread-lock compound, hold the badge halves securely in place. Steel plugs tapped flush into the counterbore of the screw holes permanently deny access to the screws, so that the removal of the badge will be extremely difficult for even the most experienced thieves. A computer database of registered owners is maintained by the manufacturer of the badge.

The personal information on the badge provides anyone who sees the bicycle, but particularly law enforcement authorities, a means to compare the person possessing the bicycle with the characteristics of the true owner. If the sticker is removed, the suspicion of theft will be immediately raised. Authorities can call the phone number on the badge to verify the ownership of the bicycle. The reward offer helps to induce any person who finds the bicycle to report the discovery of a possibly lost or stolen bicycle. As a result, the bicycle can be returned to its owner.

BRIEF DESCRIPTION OF THE DRAWINGS

FIG. 1A is a front perspective view of a tamper-resistant owner identification badge for bicycles in accordance with a preferred embodiment of the invention.

FIG. 1B is a front perspective sectional view of the badge of FIG. 1A.

FIG. 1C is a front perspective exploded view of the badge of FIG. 1 A.

FIG. 1D is a front view of the sticker on the identification badge.

FIG. 2A is a front perspective view of an owner identification badge for bicycles in accordance with an alternative embodiment of the invention.

FIG. 2B is a rear perspective sectional view of the badge of FIG. 2A.

FIG. 2C is a rear perspective exploded view of the badge of FIG. 2A.

Figure 3:
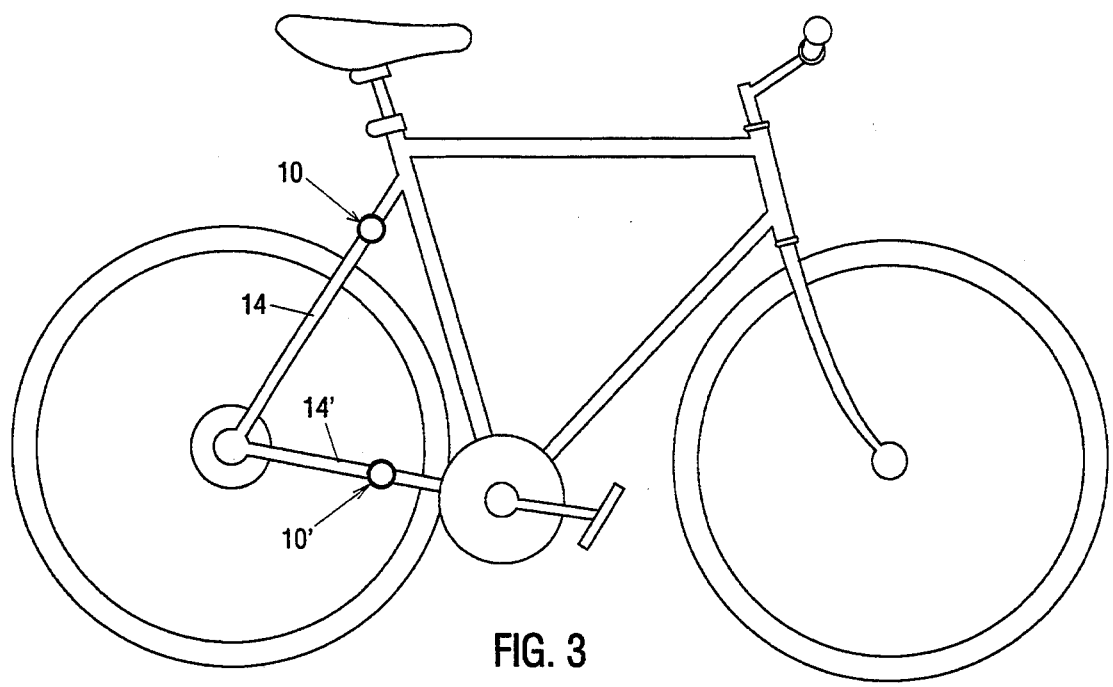
FIG. 3 is a side view of tamper-resistant owner identification badges mounted on the frame of a bicycle.

| Drawing Reference Numerals | |
| --- | --- |
| 10. Badge | 11. Hole |
| 12. Front Casing member | 13. Rear Casing Member |
| 14. Seatstay Tube | 15. Mounting Tape |
| 16. Indicia | 17. Registration Number |
| 18. Reward Offer | 19. Toll-Free Number |
| 20. Cap Screw | 21. Counterbore |
| 22. Sealing Discs | 23. Semi-Cylindrical Channel |
| 24. Sticker | 25. Thread-Lock Compound |
| 30. Badge | 31. Front Casing Member |
| 32. Rear Casing Member | 33. Security Pin |
| 34. Rubber Sleeve | 35. Hole |
| 36. Dimple | |
| 40. Box | 41. Die-Cut |

DESCRIPTION—FIG. 1A—PREFERRED EMBODIMENT

In accordance with a preferred embodiment of the invention shown in the front perspective view of FIG. 1A, a tamper-resistant owner identification badge comprises a cylindrical badge 10 with a large through hole 11 orthogonal to the axis of the badge. The badge, which is comprised of a front casing member 12 and a rear casing member 13, is permanently mounted around the seatstay tube 14 on the frame of a bicycle (FIG. 3). The seatstay tube is the tube that extends from the seat to the hub of the rear wheel. Hole 11 is formed by two opposing, semi-cylindrical channels 23, one on each casing member. A piece of extremely high strength mounting tape 15, such as 3M Scotch TM Brand VHB TM Double Coated Acrylic Foam Tape, is disposed between badge 10 and seatstay tube 14 to take up the difference between the diameters of hole 11 and the seatstay tube. The resilient tape allows the badge to be installed on various seatstay tubes of slightly different diameters. Tape 15 also prevents badge 10 from sliding along seatstay tube 14. Indicia 16 are debossed onto the front face of badge 10, and includes the badge's unique registration number 17, a reward offer 18, and a toll-free phone number 19.

The badge is made of case-hardened steel, so that it strongly resists forced removal or destruction. The hardness of the badge also strongly resists the removal of indicia 16 by filing or grinding. A sticker 24 containing additional information is placed on the side of badge 10, and will be further explained in FIG. 1D. A 24-hour computer database, which is operated by the manufacturer of the badge, maintains a record of all registered owners. Upon the receipt of a particular registration number 17 from a caller, a database operator can quickly retrieve information regarding the bicycle's owner. When the owner is identified, the bicycle can be easily returned, or the thief apprehended.

DESCRIPTION—FIG. 1B

A front perspective sectional view of the badge is shown. The two casing members 12 and 13 of badge 10 are held together by two cap screws 20 (only one shown) sunken into two counterbores 21 on the outside face of front casing member 12. The threads of screws 20 are coated with a thread-lock compound 25 which, when cured, prevents the screws from loosening. Compound 25 is sold by Loctite Corp. under the trademark #204 Dri-Loc. Two case-hardened, steel sealing discs 22 are tightly and flushly fitted into counterbores 21. The discs permanently deny access to the screws, so that the two casing members cannot be separated. Because the steel discs are mounted flush on the surface of the badge, their removal is also prevented.

DESCRIPTION—FIG. 1C

The identification badge is shown in a front perspective exploded view. The badge is installed by first wrapping tape 15 around bicycle seat stay tube 14. After the two casing members 12 and 13 are screwed together around tape 15 and seatstay tube 14, sealing discs 22 are tapped into counterbores 21. The discs have chamfered inside rims (not shown) to facilitate their installation. Lastly, sticker 24 is applied to the side of the badge.

DESCRIPTION—FIG. 1D

The details on sticker 24 are shown here. The sticker is made of a thin sheet of aluminum with an adhesive backing (not shown). Registration number 17, which is also on the outside face of front casing member 12 (FIG. 1A), is debossed onto the sticker. Boxes 40 on the soft metal sticker allows the owner to inscribe on it his or her sex, height, and date of birth. Die cuts 41 ensure that the sticker will be extremely difficult to remove intact. The prominent location of the sticker on the badge makes it easily noticed, so that anyone, especially law enforcement authorities, can quickly compare the physical characteristics of the registered owner with those of the person in possession of the bicycle. The absence of portions or the whole sticker will be a sign of possible theft.

DESCRIPTION—FIG. 2A—ALTERNATIVE EMBODIMENT

Alternatively, the tamper-resistant bicycle owner identification badge can comprise of a hardened steel badge 30 with a hole 11, a front casing member 31 and a rear casing member 32. Indicia 33 debossed on the outside face of front casing member 31 carries the same information as described in FIG. 1A. A rubber sleeve 34 is disposed between hole 11 and bicycle seatstay tube 14.

DESCRIPTION—FIG. 2B

In this rear perspective sectional view of steel badge 30, the two casing members 31 and 32 are held together by two cap screws 20 (one shown). The screws, also treated with thread-lock compound 25, are sunken into two counterbores 21' on the outside face of rear casing member 32. Two case-hardened, steel security pins 33 (one shown) are driven into two holes 35 (one shown) each orthogonally intersecting the counterbores above the screws. Once completely driven into holes 35, pins 33 cannot be removed, so that they permanently deny access to screws 20 and prevent the removal of the badge.

DESCRIPTION—FIG. 2C

The alternative embodiment of the identification badge is shown here in a rear perspective exploded view. The badge is installed by first wrapping rubber sleeve 34 around seatstay tube 14. After the two casing members 31 and 32 are screwed together around the sleeve and the seatstay tube with screws 20, pins 33 are driven into holes 35. The dimples 36 near the driven ends of the pins ensure a very tight and permanent fit. Lastly, sticker 24 is applied to the side of the badge.

DESCRIPTION—FIG. 3

The owner identification badge, or badge 10, is shown mounted on the seatstay tube 14 of a bicycle. Alternatively, a badge 10' can be mounted on the chainstay tube 14', which is the tube that extends from the hub of the pedal driven gear to the hub of the rear wheel. In addition to helping identify the owner of a lost or stolen bicycle, the presence of the badge positively deters would-be thieves from stealing the bicycle, not only because it can expose them to potential arrest if the bicycle is found in their possession, but also because it will render the bicycle much more difficult or nearly impossible to sell. Buyers will be deterred from buying stolen bicycles.

Ramifications And Scope

While the above descriptions are specific, they should not be considered as limitations on the scope of the invention, but only as examples of the embodiments. Many other ramifications and variations are possible within the teachings of the invention. For example, in addition to bicycles, the badge can be sized for mounting on the tubular portion of other types of structures or items, such as shopping cart handles, camera tripod legs, folding chair legs, etc. Instead of sticker 24, the personal information of the owner, including the owner's name, can be debossed directly onto the face of the badge. Other types or additional information can be included. Tape 15 and rubber sleeve 34 can be replaced by other resilient materials, or even eliminated if hole 11 is sized to precisely fit a seatstay tube 14 of a particular diameter. Other thread-lock compounds can be used, or can be eliminated without substantial loss of tamper resistance. The badge can also be sized for mounting on other parts of the bicycle. Accordingly, the scope of the invention should be not be determined by the specific embodiments illustrated, but by the appended claims and their legal equivalents.

I claim:

1. An identification device adapted for mounting on a generally tubular portion of a structure, comprising:
   a pair of opposite casing members each having a recessed channel, so that when said casing members are combined, said channels combine to define a hole at an interface between said casing members, said combined casing members having spaced outside faces,
   a plurality of counterbores formed into said outside face of one of said casing members,
   a screw disposed within each of said counterbores, said screw extending into said pair of casing members for securely combining said casing members around said tubular portion of said structure, so that said tubular portion of said structure passes through said hole between said casing members, said screw having a head positioned within said counterbore below said outside face of said casing member,
   a sealing disc frictionally and flushly fitted within each said counterbores so that said sealing disc will resist being removed and deny access to said screws, whereby said casing members will resist from being separated and removed from said structure, and
   indicia disposed on said outside face of at least one of said casing members.

2. The identification device of claim 1, further including resilient means adapted for being disposed between said hole said tubular portion of said structure.

3. The identification device of claim 2 wherein said resilient means comprises a piece of mounting tape.

4. The identification device of claim 2 wherein said resilient means comprises a rubber sleeve.

5. The identification device of claim 1, further including an informational sticker for displaying physical characteristics of a rightful owner of said structure, so that the ownership status of a person in possession of said structure can be determined.

6. The identification device of claim 1 wherein said casing members and said sealing discs are made of hardened steel.

7. The identification device of claim 1 wherein said indicia includes at least an owner registration number, a reward offer, and a toll-free telephone number, whereby a person discovering said structure will be induced to report the discovery.

8. An identification device adapted for mounting on a generally tubular portion of a structure, comprising:
   a pair of opposite casing members each having a recessed channel, so that when said casing members are combined, said channels combine to define a hole at an interface between said casing members, said combined casing members having spaced outside faces,
   a plurality of counterbores formed into said outside face of one of said casing members,
   screw disposed within each of said counterbores, said screw extending into said pair of casing members for securely combining said casing members around said tubular portion of said structure, so that said tubular portion of said structure passes through said hole between said casing members, said screw having a head positioned within said counterbore below said outside face of said casing member,
   a security pin extending across each of said counterbores above said heads of said screws for denying access to said screws, whereby said casing members will resist from being separated and removed from said structure, and
   indicia disposed on said outside face of at least one of said casing members.

9. The identification device of claim 8, further including resilient means adapted for being disposed between said hole said tubular portion of said structure.

10. The identification device of claim 9 wherein said resilient means comprises a piece of mounting tape.

11. The identification device of claim 9 wherein said resilient means comprises a rubber sleeve.

12. The identification device of claim 8, further including an informational sticker for displaying physical characteristics of a rightful owner of said structure, so that the ownership status of a person in possession of said structure can be determined.

13. The identification device of claim 8 wherein said casing members and said security pins are made of hardened steel.

14. The identification device of claim 8 wherein said indicia includes at least an owner registration number, a reward offer, and a toll-free telephone number, whereby a person discovering said structure will be induced to report the discovery.

* * * * *